US012647278B2

(12) United States Patent
Li et al.

(10) Patent No.:  US 12,647,278 B2
(45) Date of Patent:  Jun. 2, 2026

(54) METHOD AND SYSTEM FOR CROSS-CHAIN TRANSFER OF DATA BASED ON DECENTRALIZED IDENTIFIERS

(71) Applicant: CHINA ACADEMY OF INFORMATION AND COMMUNICATIONS TECHNOLOGY, Beijing (CN)

(72) Inventors: Zhiping Li, Beijing (CN); Jiagui Xie, Beijing (CN); Jian Guo, Beijing (CN); Bo Zhang, Beijing (CN); Yuanchao Liu, Beijing (CN); Wei Yang, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 106 days.

(21) Appl. No.: 18/710,775

(22) PCT Filed: Jun. 6, 2022

(86) PCT No.: PCT/CN2022/097235
§ 371 (c)(1),
(2) Date: May 16, 2024

(87) PCT Pub. No.: WO2023/092986
PCT Pub. Date: Jun. 1, 2023

(65) Prior Publication Data
US 2025/0038993 A1      Jan. 30, 2025

(30) Foreign Application Priority Data

Nov. 29, 2021    (CN) .......................... 202111427565.4

(51) Int. Cl.
| | |
|---|---|
| *H04L 29/06* | (2006.01) |
| *H04L 9/30* | (2006.01) |
| *H04L 9/32* | (2006.01) |

(52) U.S. Cl.
CPC .............. *H04L 9/3247* (2013.01); *H04L 9/30* (2013.01)

(58) Field of Classification Search
CPC ....... H04L 9/3247; H04L 9/30; H04L 9/3239; H04L 9/50; H04L 9/0825; H04L 9/3249;
(Continued)

(56) References Cited

U.S. PATENT DOCUMENTS

| | | | |
|---|---|---|---|
| 2018/0040040 A1* | 2/2018 | Barski ....................... | H04L 9/50 |
| 2018/0315046 A1 | 11/2018 | Joao et al. | |
| 2022/0021528 A1* | 1/2022 | Dawson, III .......... | H04L 9/3236 |

FOREIGN PATENT DOCUMENTS

| | | |
|---|---|---|
| CN | 113159898 A | 7/2021 |
| CN | 113159902 A | 7/2021 |

(Continued)

OTHER PUBLICATIONS

International Search Report of PCT/CN2022/097235 mailed Sep. 9, 2022, 2 pages.

*Primary Examiner* — Edward Zee
*Assistant Examiner* — Leynna Truvan
(74) *Attorney, Agent, or Firm* — BROOKS KUSHMAN P.C.

(57) ABSTRACT

The embodiments of the disclosure disclose a method and system for cross-chain transfer of data based on decentralized identifiers. According to the disclosure, after receiving a data transfer transaction sent by a terminal of an original holder, a source chain reads a public key of the original holder in a corresponding first BID document according to a first BID carried by the data transfer transaction, and
(Continued)

verifies a signature carried by the data transfer transaction. After the signature passes verification, the source chain initiates a cross-chain transaction. In response to the cross-chain transaction, a target chain deploys a second BID document in the target chain, and a public key of a new holder and data to be transferred are recorded in the second BID document. Further, the source chain replaces the public key of the original holder in the first BID document with the public key of the new holder.

15 Claims, 2 Drawing Sheets

(58) Field of Classification Search
CPC ........................... H04L 9/3271; G06Q 20/401; G06Q 20/3825; G06Q 20/3829; H04M 15/8242; H04M 2215/7846; H03M 1/282; H04N 21/6581; H04N 21/8352; G06F 9/466; G06F 2211/008; G06F 16/93; G06F 2221/2103; G05B 2219/25235; G05B 2219/25423; G05B 2219/41253; G05B 2219/50073; G05B 2219/50197; G07B 2017/00766; G07B 2017/00758; G06T 2207/30176; G11B 20/00181; G01R 31/31703
See application file for complete search history.

(56) References Cited

FOREIGN PATENT DOCUMENTS

| | | | |
|----|------------|---|---------|
| CN | 113541970 A | | 10/2021 |
| CN | 113850607 A | | 12/2021 |

* cited by examiner

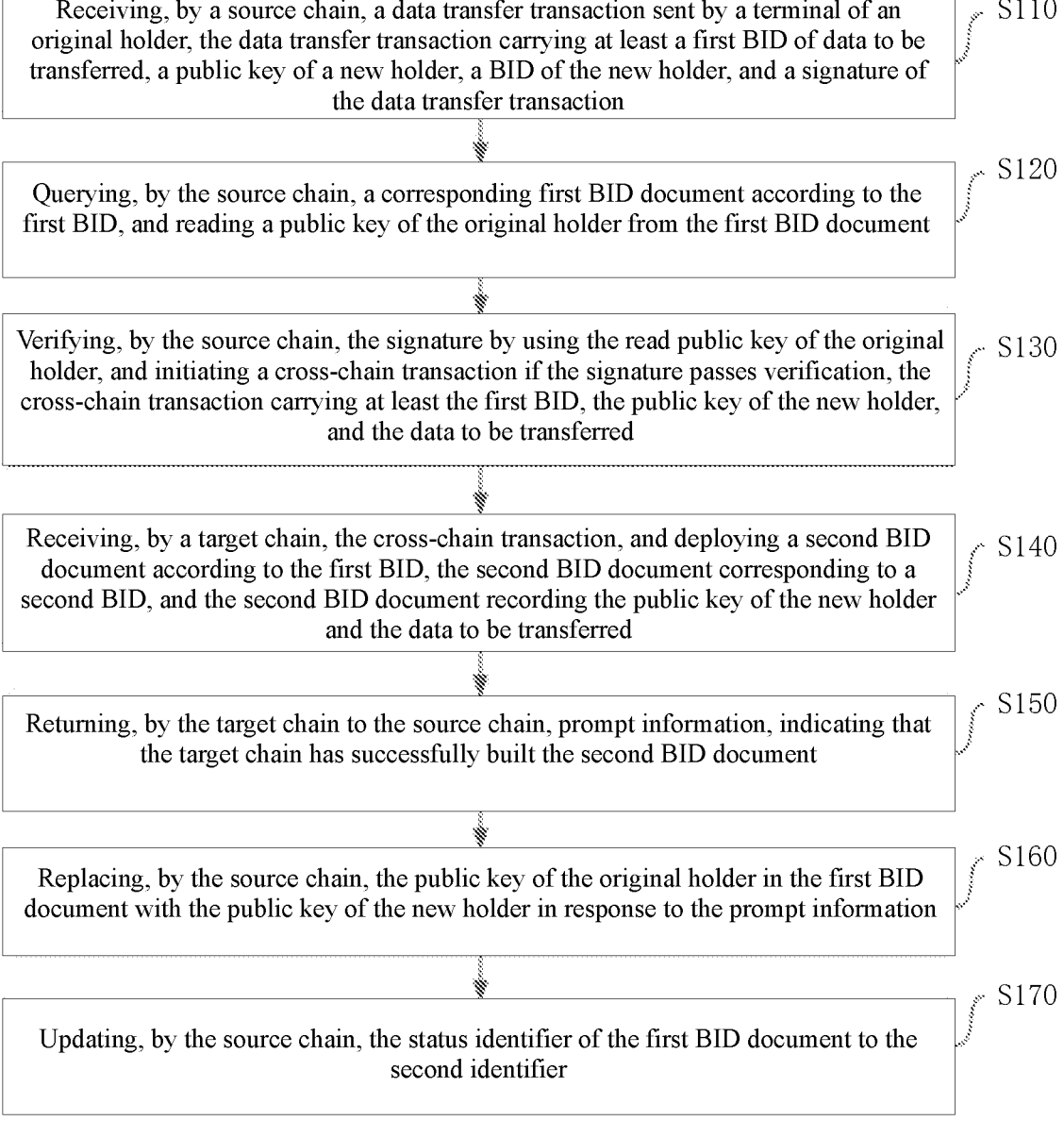

Receiving, by a source chain, a data transfer transaction sent by a terminal of an original holder, the data transfer transaction carrying at least a first BID of data to be transferred, a public key of a new holder, a BID of the new holder, and a signature of the data transfer transaction          S110

Querying, by the source chain, a corresponding first BID document according to the first BID, and reading a public key of the original holder from the first BID document          S120

Verifying, by the source chain, the signature by using the read public key of the original holder, and initiating a cross-chain transaction if the signature passes verification, the cross-chain transaction carrying at least the first BID, the public key of the new holder, and the data to be transferred          S130

Receiving, by a target chain, the cross-chain transaction, and deploying a second BID document according to the first BID, the second BID document corresponding to a second BID, and the second BID document recording the public key of the new holder and the data to be transferred          S140

Returning, by the target chain to the source chain, prompt information, indicating that the target chain has successfully built the second BID document          S150

Replacing, by the source chain, the public key of the original holder in the first BID document with the public key of the new holder in response to the prompt information          S160

Updating, by the source chain, the status identifier of the first BID document to the second identifier          S170

Fig. 1

METHOD AND SYSTEM FOR CROSS-CHAIN TRANSFER OF DATA BASED ON DECENTRALIZED IDENTIFIERS

This application is the U.S. national phase of PCT Application No. PCT/CN2022/097235 filed on Jun. 6, 2022, which claims priority to Chinese Patent Application No. CN202111427565.4, filed on Nov. 29, 2021, entitled "Method and System for Cross-Chain Transfer of Data Based on Decentralized Identifiers", the disclosures of which are hereby incorporated in their entirety by reference herein.

TECHNICAL FIELD

The disclosure relates to a technical field of blockchains, and for example relates to a method and system for cross-chain transfer of data based on decentralized identifiers.

BACKGROUND

As a distributed ledger technology, a blockchain-based technology mainly has advantages for example in immutability of data information, traceability of data information, distributed decentralization, a trustless system, and so on. The blockchain technology has been currently applied in many fields such as finance, health care, supply chains, asset management, Internet-based E-Commerce, and so on.

Cross-chain technology has emerged in related arts to facilitate data flow between heterogeneous/isomorphic blockchains. Existing cross-chain technologies generally include notary mechanism, side chain technology, relay technology, and the like.

SUMMARY

Embodiments of the disclosure disclose a method and system for cross-chain transfer of data based on decentralized identifiers, to implement a transfer of data ownership among different blockchains.

In an aspect of the embodiments of the disclosure, disclosed is a method for cross-chain transfer of data based on decentralized identifiers, comprising:

receiving, by a source chain, a data transfer transaction sent by a terminal of an original holder, the data transfer transaction carrying at least a first blockchain-based identifier BID of data to be transferred, a public key of a new holder, a BID of the new holder, and a signature of the data transfer transaction;

querying, by the source chain, a corresponding first BID document according to the first BID, and reading a public key of the original holder from the first BID document;

verifying, by the source chain, the signature with the read public key of the original holder, and initiating a cross-chain transaction in a case where the signature passes verification, the cross-chain transaction carrying at least the first BID, the public key of the new holder, and the data to be transferred;

receiving, by a target chain, the cross-chain transaction, and deploying a second BID document according to the first BID, the second BID document corresponding to a second BID, and the second BID document recording the public key of the new holder and the data to be transferred;

returning, by the target chain to the source chain, prompt information indicating that the target chain has successfully built the second BID document; and replacing, by the source chain in response to the prompt information, the public key of the original holder in the first BID document with the public key of the new holder.

In another aspect of the embodiments of the disclosure, disclosed is a system for cross-chain transfer of data based on decentralized identifiers, the system comprising a source chain and a target chain;

the source chain being configured to receive a data transfer transaction sent by a terminal of an original holder, the data transfer transaction carrying at least a first blockchain-based identifier BID of data to be transferred, a public key of a new holder, a BID of the new holder, and a signature of the data transfer transaction;

the source chain being further configured to query a corresponding first BID document according to the first BID, and to read a public key of the original holder from the first BID document;

the source chain being further configured to verify the signature with the read public key of the original holder, and to initiate a cross-chain transaction in a case where the signature passes verification, the cross-chain transaction carrying at least the first BID, the public key of the new holder, and the data to be transferred;

the target chain being configured to receive the cross-chain transaction, and to deploy a second BID document according to the first BID, the second BID document corresponding to a second BID, and the second BID document recording the public key of the new holder and the data to be transferred;

the target chain being further configured to return to the source chain prompt information indicating that the target chain has successfully built the second BID document; and the source chain being further configured to replace the public key of the original holder in the first BID document with the public key of the new holder in response to the prompt information.

According to the method for cross-chain transfer of data based on decentralized identifiers in the embodiments of the disclosure, after receiving the data transfer transaction sent by the terminal of the original holder, the source chain reads the public key of the original holder in the corresponding first BID document according to the first BID carried by the data transfer transaction, and verifies the signature carried by the data transfer transaction. If the signature passes verification, it is indicated that the data transfer transaction was initiated by the original holder. After passing verification, the source chain initiates the cross-chain transaction. The target chain deploys the second BID document in the target chain in response to the cross-chain transaction, wherein the public key of the new holder and the data to be transferred are recorded in the second BID document. Further, the source chain replaces the public key of the original holder in the first BID document with the public key of the new holder. In the disclosure, the public key recorded in the BID document represents the ownership of the corresponding data. For example, the cross-chain transfer of data ownership is achieved in the disclosure by deploying the second BID document in the target chain, recording the public key of the new holder in the second BID document, and replacing the public key of the original holder in the first BID document with the public key of the new holder in the source chain.

In addition, the source chain uses in advance the public key of the original holder in the first BID document to verify the signature carried by the data transfer transaction, and the cross-chain transaction is initiated in a case where the signature passes verification, and thus the security of cross-chain transfer of data ownership is improved effectively.

The technical solutions of the disclosure are described in further detail with reference to the drawings and embodiments.

BRIEF DESCRIPTION OF THE DRAWINGS

The accompanying drawings, which form a part of the specification, illustrate embodiments of the disclosure, and together with the description, serve to explain the principles of the disclosure.

The disclosure can be more clearly understood from the following detailed description with reference to the accompanying drawings. The drawings described herein are intended to provide a further understanding of the disclosure and form a part of the disclosure. The illustrative embodiments and descriptions of the disclosure are used to explain the disclosure, and do not constitute an improper limitation of the disclosure. Obviously, the drawings in the following description are only some embodiments of the disclosure. For those ordinary skilled in the art, other drawings can be obtained according to these drawings without creative labor.

FIG. 1 is a flow diagram of a method for cross-chain transfer of data based on decentralized identifiers according to an embodiment of the disclosure.

DETAILED DESCRIPTION

Figure 2:
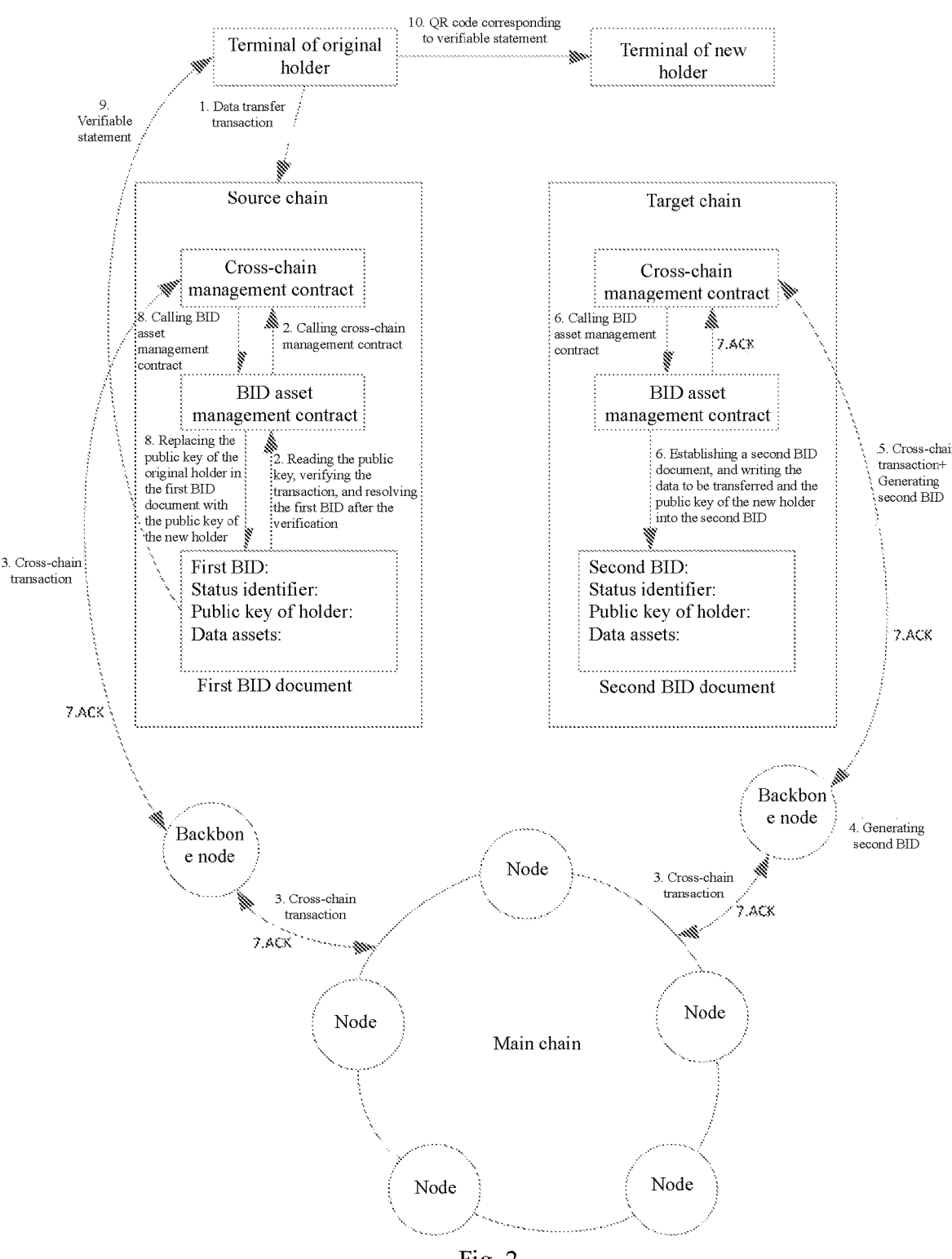
FIG. 2 is a flow diagram of a method for cross-chain transfer of data based on decentralized identifiers according to another embodiment of the disclosure.

The embodiments of the disclosure disclose a method and system for cross-chain transfer of data based on decentralized identifiers, and the cross-chain transfer of data ownership is achieved by deploying a second BID document in a target chain, recording a public key of a new holder in the second BID document, and replacing a public key of an original holder in a first BID document with the public key of the new holder in a source chain.

The solutions in the embodiments of the disclosure may be implemented in various computer languages, such as an object-oriented programming language (e.g., Java) and an interpreted scripting language (e.g., JavaScript or JS).

In order to make the technical solutions and advantages of the embodiments of the disclosure clearer, exemplary embodiments of the disclosure will be described in detail below with reference to the attached drawings. Obviously, the described embodiments are only part of the embodiments of the disclosure, but not an exhaustive list of all the embodiments. It is noted that embodiments and features in the embodiments of the disclosure may be combined with each other without conflict. It is noted that the relative arrangement, numerical expressions and numerical values of components and steps described in these embodiments do not limit the scope of the disclosure, unless otherwise stated.

It is also understood that in the embodiments of the disclosure, "a plurality of" may refer to two or more, and "at least one" may refer to one, two, or more.

It can be understood by those skilled in the art that terms such as "first" and "second" in the embodiments of the disclosure are only used to distinguish different steps, devices or modules, and do not represent any specific technical meaning or their inevitable logical order.

It is also understood that any component, data or structure mentioned in the embodiments of the disclosure may be understood generally as one or more components, data or structures unless explicitly defined or given contrary enlightenment in the context.

It is also understood that the description of various embodiments in the disclosure focuses on the differences among various embodiments, and the same or similar parts can be referred to each other, and will not be repeated for brevity.

The description of at least one exemplary embodiment below is only illustrative, and in no way should it be taken as any limitation on the disclosure, its application or uses.

Technologies, methods and apparatuses known to those ordinary skilled in art may not be discussed in detail, which, however, should be regarded as part of the specification in appropriate cases.

It is noted that similar reference numerals and letters indicate similar items in the following figures, so once an item is defined in one figure, it will not be further discussed in the following figures.

In addition, the term "and/or" herein is only an association relationship describing the associated objects, representing three kinds of possible relationships, for example, A and/or B may represent A alone, A and B, and B alone. In addition, the character "/" herein represents generally an "or" relationship between the two associated objects.

Referring to FIG. 1 which is a flow diagram of a method for cross-chain transfer of data based on decentralized identifiers according to an embodiment of the disclosure. As shown in FIG. 1, the method comprises the following steps.

In a step S110, a source chain receives a data transfer transaction sent by a terminal of an original holder, the data transfer transaction carrying at least a first Blockchain-based Identifier (BID) of data to be transferred, a public key of a new holder, a BID of the new holder, and a signature of the data transfer transaction.

In the disclosure, a BID is a decentralized identifier, and a decentralized identity (DID) provides infrastructure for cross-system and cross-institutional trusted digital identity and data exchange services. In the disclosure, at least one piece of data or each piece of data may correspond to one BID, and at least one user or each user may also correspond to on BID. To simplify descriptions, a BID corresponding to the data to be transferred is referred to as a first BID.

In the disclosure, the original holder refers to an original owner of the data to be transferred, and the new holder refers to a new owner of the data to be transferred. Optionally, the data to be transferred may include digital assets.

In a step S120, the source chain queries a corresponding first BID document according to the first BID, and reads a public key of the original holder from the first BID document.

In the disclosure, at least one BID or each BID may correspond to one BID document, and information on the BID corresponding to the BID document may be recorded in the BID document. For example, in a BID document corresponding to a digital asset, the digital asset itself, an abstract of the digital asset or an index the digital asset may be recorded, and a public key of holder of the digital asset may also be recorded. In the disclosure, by recording the public key of the holder in the BID document, it may be represented that the corresponding digital asset belongs to the holder.

In the disclosure, at least one digital asset or a BID document corresponding to each digital asset may be used as block data and recorded in a ledger database of a blockchain. For example, in the source chain, the first BID document is used as the block data of the source chain, and the first BID document is stored in a ledger database of the source chain.

In some optional embodiments, a BID asset management contract is deployed in the source chain. At least one node or each node in the source chain performs the above step S120 and the following steps S130 to S160 by calling and executing the BID asset management contract, after receiving the data transfer transaction.

In the step S130, the source chain verifies the signature by using the read public key of the original holder, and initiates a cross-chain transaction in a case where the signature passes verification, wherein the cross-chain transaction carries at least the first BID, the public key of the new holder, and the data to be transferred.

In the disclosure, the verifying the signature by using the public key of the original holder may be considered as verifying the signature for the data transfer transaction. If the verification for the signature of the data transfer transaction passes, it means that the data transfer transaction was indeed initiated by the original holder of the data to be transferred, and in this case, the source chain may initiate a cross-chain transaction. If the verification for the signature of the data transfer transaction fails (that is, not pass), it means that the data transfer transaction was not initiated by the original holder of the assets to be transferred, and in this case, the source chain does not initiate a cross-chain transaction.

In some optional embodiments, a cross-chain management contract is deployed in the source chain. In a case where the verification for the signature of the data transfer transaction passes, the BID asset management contract calls the cross-chain management contract, to initiate a cross-chain transaction. Before initiating the cross-chain transaction, the data to be transferred may be read from the first BID document, and then be written into the cross-chain transaction.

It is noted that, in the disclosure, the cross-chain operation between the source chain and a target chain is transparent to the original holder, and the original holder only needs to specify the BID and public key of the new holder or to specify the BID and address of the new holder (the address and public key of the new holder may be deduced from each other), without paying attention to which blockchain an account of the new holder is on, so that the operations of the original holder are relatively simple. In this case, the new holder specified by the original holder may be an account in other blockchains or an account in the source chain. Therefore, when receiving the data transfer transaction, the source chain may pre-determine a blockchain to which the new holder belongs, and then make corresponding responses.

In some optional embodiments, the step S130 comprises:

verifying, by the source chain, the signature with the read public key of the original holder, and in a case where the signature passes verification, determining whether the new holder is an account registered in the source chain according to the BID of the new holder; and if the new holder is not the account registered in the source chain, initiating the cross-chain transaction.

If a blockchain identifier in the BID of the new holder is not equal to a blockchain identifier of the source chain, it means that the new holder is not an account registered in the source chain. If the blockchain identifier in the BID of the new holder is equal to the blockchain identifier of the source chain, it means that the new holder is an account registered in the source chain.

If the new holder is not an account registered in the source chain, the cross-chain transaction is initiated. Optionally, the blockchain identifier may be read from the BID of the new holder, as a blockchain identifier of the target chain in the cross-chain transaction.

The method further comprises:

if the new holder is an account registered in the source chain, replacing the public key of the original holder in the first BID document with the public key of the new holder.

If the new holder is an account registered in the source chain, the public key of the original holder in the first BID document may be replaced directly with the public key of the new holder, without the need to build and send the cross-chain transaction.

In a step S140, the target chain receives the cross-chain transaction, and deploys a second BID document according to the first BID, the second BID document corresponding to a second BID, and the second BID document recording the public key of the new holder and the data to be transferred.

In the disclosure, at least one BID may comprise a blockchain identifier and a suffix string. At least one blockchain identifier is used to route to a corresponding blockchain according to the blockchain identifier during a resolution of the BID comprising the blockchain identifier. The suffix string corresponding to the same piece of data is unique in the BID of at least one blockchain.

The blockchain identifier comprised in the first BID is a blockchain identifier of the source chain, the blockchain identifier comprised in the second BID is a blockchain identifier of the target chain, and the suffix string comprised in the first BID is the same as the suffix string comprised in the second BID.

In the disclosure, the source chain and the target chain are two sub-chains, and at least one sub-chain is connected with a main chain. For example, both the source chain and the target chain may be connected with the main chain. When a third party needs to verify a BID, the third party may send the BID to the main chain. The main chain returns an address of the corresponding sub-chain to the third party by resolving the blockchain identifier from the BID. After obtaining the address of the corresponding sub-chain, the third party may access the sub-chain based on the address, to request the sub-chain to verify the BID according to a BID document stored in the sub-chain.

Optionally, the suffix string corresponding to the same piece of data being unique in the BID of at least one blockchain may mean that the suffix string corresponding to the same piece of data is unique in all BIDs of all blockchains. In other words, the suffix string of the BID in any blockchain is unique not only in this blockchain, but also in any other blockchain.

Because the suffix string of the first BID and the suffix string of the second BID are the same, the first BID and the second BID correspond to the same piece of data. In addition, because the blockchain identifier of the first BID is the blockchain identifier of the source chain and the blockchain identifier of the second BID is the blockchain identifier of the target chain, the routing during the resolution of the BID is not affected.

In some optional embodiments, the target chain comprises a backbone node and a plurality of in-chain nodes. The receiving, by the target chain, the cross-chain transaction and deploying a second BID document according to the first BID comprises:

receiving, by the backbone node, the cross-chain transaction, and reading the first BID from the cross-chain transaction;

replacing, by the backbone node, the blockchain identifier in the first BID with the blockchain identifier of the target chain to generate the second BID, and sending the second BID and the cross-chain transaction to at least one in-chain node in the plurality of in-chain nodes; and deploying, by the at least one in-chain node in the plurality of in-chain nodes, a second BID document according to the second BID, and recording the public key of the new holder carried by the cross-chain transaction to the second BID document.

In some optional embodiments, a BID asset management contract may also be deployed in the target chain. At least one in-chain node or each in-chain node in the target chain deploy the second BID document by calling and executing the BID asset management contract, after receiving the cross-chain transaction.

In a step S150, the target chain returns to the source chain prompt information indicating that the target chain has successfully built the second BID document.

In some optional embodiments, the prompt information may be a acknowledge message, for example, an acknowledge character (ACK) message.

In a step S160, the source chain replaces the public key of the original holder in the first BID document with the public key of the new holder in response to the prompt information.

In the disclosure, the cross-chain transfer of data ownership is achieved by deploying the second BID document in the target chain, recording the public key of the new holder in the second BID document, and replacing the public key of the original holder in the first BID document with the public key of the new holder in the source chain.

In some optional embodiments, a status identifier is recorded in the first BID document. If the status identifier is a first identifier, it means that the first BID document is accessible, and if the status identifier is a second identifier, it means that the first BID document is inaccessible. The first BID document being accessible means that the content in the first BID document may be read and modified. The first BID document being inaccessible means that the content in the first BID document cannot be read or modified.

As shown in FIG. 1, after the S160, a step S170 may be further performed where the source chain updates the status identifier of the first BID document to the second identifier.

It is noted that, in the disclosure, the source chain updates the status identifier of the first BID document to the second identifier only after receiving the prompt information of the target chain and replacing the public key of the original holder in the first BID document with the public key of the new holder, because if the source chain receives the prompt information of the target chain, it means that a second BID document with the same suffix string as that in the first BID document has been built in the target chain, in other words, the same piece of data corresponds to two BID documents at the same time and the public key of the new holder is recorded in both BID documents. Therefore, in the disclosure, after the source chain receives the prompt information of the target chain and replaces the public key of the original holder in the first BID document with the public key of the new holder, the source chain updates the status identifier of the first BID document to the second identifier, thereby invalidating the first BID document.

If the source chain has not received the prompt information from the target chain, it means that the target chain has not successfully built the second BID document, or that a new BID document is not built because both the original holder and the new holder are accounts in the source chain and the data ownership transfer between the original holder and the new holder does not require a cross-chain manner.

In this case, the status identifier in the first BID document cannot be updated to the second identifier.

It is also noted that, in the disclosure, once the status identifier of the BID document is updated to the second identifier, the BID document cannot be read any more, which may be beneficial technically. For example, after the data ownership is transferred from the original holder to the new holder, the new holder may transfer the data ownership to another holder; and after the data ownership is transferred to the another holder, the public key of the new holder recorded in the first BID document is no longer accurate. Since the current holder of the data ownership is the another holder, in order to avoid errors during the resolution of the BID, in the disclosure, the BID document cannot be read any more once the status identifier of the BID document is updated to the second identifier.

In some optional embodiments, the step S120 may comprise: querying, by the source chain, the corresponding first BID document according to the first BID, and reading the status identifier in the first BID document; if the read status identifier in the first BID document is the first identifier, reading the public key of the original holder from the first BID document; and if the read status identifier in the first BID document is the second identifier, terminating the data transfer transaction instead of reading the public key of the original holder from the first BID document.

In some optional embodiments, after the step S160, the method further comprises: generating, by the source chain, a verifiable statement indicating that the source chain has replaced the public key of the original holder in the first BID document with the public key of the new holder; sending, by the source chain, the verifiable statement to a terminal of the original holder; and forwarding, by the terminal of the original holder, the verifiable statement to a terminal of the new holder.

After receiving the verifiable statement, the terminal of the original holder may first convert the verifiable statement into a Quick Response (QR) code, and then send the QR code to the terminal of the new holder. The terminal of the new holder automatically recognizes the QR code, so as to confirm whether the source chain has replaced the public key of the original holder in the first BID document with the public key of the new holder.

Referring to FIG. 2 which is a flow diagram of a method for cross-chain transfer of data based on decentralized identifiers according to another embodiment of the disclosure. As shown in FIG. 2, the following contracts are deployed initially in both a source chain and a target chain:

(1) a BID asset management contract, which is a smart contract M for implementing a transfer of non-homogeneous assets (which can be referred to as assets, for example may be digital artworks), wherein at least one non-homogeneous asset or each non-homogeneous asset may correspond to one BID document, respectively, and in the BID document, a public key of a user is recorded to indicate which user the non-homogeneous asset belongs to; and (2) a cross-chain management contract, for implementing cross-chain operations between different blockchains.

As shown in FIG. 2, the method for cross-chain transfer of data based on decentralized identifiers comprises:

when an original holder needs to transfer data (such as the data to be transferred above) to a new holder, submitting a data transfer transaction to the source chain by a terminal of the original holder, the data transfer transaction carrying at least the following information:

(1) a signature of the original holder on the data transfer transaction;

(2) a public key/address of the new holder;

(3) a BID of the data to be transferred, that is, a first BID; and (4) a BID of the new holder.

After receiving the data transfer transaction sent by the terminal of the original holder, the source chain first performs general verification on the data transfer transaction. After the general verification for the data transfer transaction passes, the source chain executes the data transfer transaction. During the execution of the data transfer transaction by the source chain, the following processes are implemented by calling and executing the BID asset management contract in the source chain:

(1) reading a public key from a corresponding first BID document in the source chain according to the first BID carried by the data transfer transaction, the read public key being a public key of the original holder in a normal case;

(2) using the read public key of the original holder to verify a signature of the data transfer transaction, wherein if verification for the signature of the data transfer transaction passes, it proves that the data transfer transaction was indeed initiated by the original holder of the data to be transferred;

(3) after the verification for the signature of the data transfer transaction passes, resolving the BID of the new holder carried by the data transfer transaction, so as to determine a blockchain to which the new holder belongs, that is, the target chain; and (4) calling the cross-chain management contract and sending a cross-chain transaction to a backbone node of the target chain, the cross-chain transaction carrying at least a source chain identifier, the data to be transferred, a target chain identifier and the public key/address of the new holder.

As shown in FIG. 2, a backbone node of the source chain submits the cross-chain transaction to a main chain after receiving the cross-chain transaction. The main chain routes the cross-chain transaction to the backbone node of the target chain according to the target chain identifier carried by the cross-chain transaction.

As shown in FIG. 2, the backbone node of the target chain replaces a blockchain identifier in the first BID with a blockchain identifier of the target chain to generate a second BID, and sends the second BID and the cross-chain transaction to at least one in-chain node or each in-chain node of the target chain.

As shown in FIG. 2, after the at least one in-chain node or each in-chain node of the target chain receives the cross-chain transaction sent by the backbone node of the target chain through the cross-chain management contract, when executing the cross-chain transaction, the following processes are implemented by calling and executing the BID asset management contract:

(1) building a second BID document in the target chain, the second BID document corresponding to the second BID;

(2) recording the data to be transferred carried by the cross-chain transaction into the second BID document, writing the public key/address of the new holder into the second BID document, and recording the second BID document as ledger data into a ledger database and storing it on-chain, which is equivalent to establishing a BID document of corresponding data assets for the new holder on the target chain; and (3) after the above step (2) is completed, sending, to the cross-chain management contract of the target chain, an ACK message indicating that the above step (2) has been completed.

As shown in FIG. 2, the target chain feeds back the ACK message to the source chain through the main chain by executing the cross-chain management contract, and the cross-chain management contract of the source chain calls the BID asset management contract of the source chain after receiving the ACK message. The BID asset management contract of the source chain replaces the public key of the original holder in the first BID document with the public key of the new holder.

Above, the disclosure provides a method for cross-chain transfer of data based on decentralized identifiers through embodiments. Hereinafter, the disclosure provides a system for cross-chain transfer of data based on decentralized identifiers through embodiments.

The system for cross-chain transfer of data based on decentralized identifiers comprises a source chain and a target chain.

The source chain is configured to receive a data transfer transaction sent by a terminal of an original holder, the data transfer transaction carrying at least a first BID of data to be transferred, a public key of a new holder, a BID of the new holder, and a signature of the data transfer transaction.

The source chain is further configured to query a corresponding first BID document according to the first BID, and to read a public key of the original holder from the first BID document.

The source chain is further configured to verify the signature with the read public key of the original holder, and to initiate a cross-chain transaction in a case where the signature passes verification, the cross-chain transaction carrying at least the first BID, the public key of the new holder, and the data to be transferred.

The target chain is configured to receive the cross-chain transaction, and to deploy a second BID document according to the first BID, the second BID document corresponding to a second BID, and the second BID document recording the public key of the new holder and the data to be transferred.

The target chain is further configured to return to the source chain prompt information indicating that the target chain has successfully built the second BID document.

The source chain is further configured to replace the public key of the original holder in the first BID document with the public key of the new holder in response to the prompt information.

In some optional embodiments, a status identifier is recorded in the first BID document. If the status identifier is a first identifier, it means that the first BID document is accessible, and if the status identifier is a second identifier, it means that the first BID document is inaccessible.

After the source chain replaces the public key of the original holder in the first BID document with the public key of the new holder in response to the prompt information, the source chain is further configured to update the status identifier of the first BID document to the second identifier.

As shown in FIG. 2, after replacing the public key of the original holder in the first BID document with the public key of the new holder, the source chain generates a verifiable statement to prove that the source chain has indeed replaced the public key of the original holder in the first BID document with the public key of the new holder. The source chain sends the generated verifiable statement to the terminal of the original holder, and the terminal of the original holder converts the verifiable statement into a QR code and sends the QR code to a terminal of the new holder. After receiving the QR code, the terminal of the new holder recognizes the QR code, so as to verify whether the source chain has replaced the public key of the original holder in the first BID document with the public key of the new holder.

Those skilled in the art will appreciate that the embodiments of the disclosure may be provided as methods, systems, or computer program products. Therefore, the disclosure may be implemented in a full hardware embodiment, a full software embodiment, or an embodiment combining software and hardware aspects. Further, the disclosure may be implemented in a computer program product embodied on one or more computer usable storage media (including, but not limited to, magnetic disk memory, CD-ROM, optical memory, etc.) including computer usable program codes therein.

The disclosure is described with reference to flowcharts/ or block diagrams of the method, device (system), and computer program product according to the embodiments of the disclosure. It is understood that each flow and/or block in the flowcharts and/or block diagrams, and combinations of flows and/or blocks in the flowcharts and/or block diagrams, may be implemented by computer program instructions. These computer program instructions may be provided to a processor of a general-purpose computer, a special purpose computer, an embedded processor, or other programmable data processing apparatus to produce a machine, such that the instructions executed by the processor of the computer or other programmable data processing apparatus produce a device for implementing the functions specified in one or more flows in the flowcharts and/or one or more blocks in the block diagrams.

These computer program instructions may also be stored in a computer-readable memory which can direct a computer or other programmable data processing apparatus to function in a particular manner, such that the instructions stored in the computer-readable memory produce an article of manufacture including an instruction device which implements the functions specified in one or more flows in the flowcharts and/or one or more blocks in the block diagrams.

These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the functions specified in one or more flows in the flowcharts and/or one or more blocks in the block diagrams.

All the embodiments in this specification are described in a progressive way, and each embodiment focuses on the differences from other embodiments. The same and similar parts among the embodiments may be referred to one another. As the above system embodiments are basically similar to the method embodiments, the description is relatively simple, and please refer to the description of the method embodiments for relevant information.

Although the preferred embodiments of the disclosure have been described, those skilled in the art can make additional changes and modifications to these embodiments once they know the basic inventive concepts. Therefore, the appended claims are intended to be interpreted as including the preferred embodiment and all changes and modifications that fall within the scope of the disclosure.

Obviously, those skilled in the art can make various changes and modifications to the disclosure without departing from the spirit and scope of the disclosure. Thus, the disclosure is also intended to comprise such modifications and variations if they fall within the scope of the claims of the disclosure and their equivalents.

What is claimed is:

1. A method for cross-chain transfer of data based on decentralized identifiers, comprising:

receiving, by a source chain, a data transfer transaction sent by a terminal of an original holder, the data transfer transaction carrying at least a first blockchain-based identifier (BID) of data to be transferred, a public key of a new holder, a BID of the new holder, and a signature of the data transfer transaction;

querying, by the source chain, a corresponding first BID document according to the first BID, and reading a public key of the original holder from the first BID document;

verifying, by the source chain, the signature with the read public key of the original holder, and initiating a cross-chain transaction in a case where the signature passes verification, the cross-chain transaction carrying at least the first BID, the public key of the new holder, and the data to be transferred;

receiving, by a target chain, the cross-chain transaction, and deploying a second BID document according to the first BID, the second BID document corresponding to a second BID, and the second BID document recording the public key of the new holder and the data to be transferred;

returning, by the target chain to the source chain, prompt information indicating that the target chain has successfully built the second BID document; and replacing, by the source chain in response to the prompt information, the public key of the original holder in the first BID document with the public key of the new holder;

wherein a status identifier is recorded in the first BID document; if the status identifier is a first identifier, it means that the first BID document is accessible, and if the status identifier is a second identifier, it means that the first BID document is inaccessible; and after replacing, by the source chain in response to the prompt information, the public key of the original holder in the first BID document with the public key of the new holder, the method further comprises:

updating, by the source chain, the status identifier of the first BID document to the second identifier.

2. The method of claim 1, wherein at least one BID comprises a blockchain identifier and a suffix string, at least one blockchain identifier is used to route to a corresponding blockchain according to the blockchain identifier during a resolution of the BID comprising the blockchain identifier, and the suffix string corresponding to the same piece of data is unique in the BID of at least one blockchain; and wherein the blockchain identifier comprised in the first BID is a blockchain identifier of the source chain, the blockchain identifier comprised in the second BID is a blockchain identifier of the target chain, and the suffix string comprised in the first BID is the same as the suffix string comprised in the second BID.

3. The method of claim 2, wherein the target chain comprises a backbone node and a plurality of in-chain nodes, and the receiving, by the target chain, the cross-chain transaction and deploying the second BID document according to the first BID comprises:

receiving, by the backbone node, the cross-chain transaction, and reading the first BID from the cross-chain transaction;

replacing, by the backbone node, the blockchain identifier in the first BID with the blockchain identifier of the target chain to generate the second BID, and sending the second BID and the cross-chain transaction to at least one in-chain node in the plurality of in-chain nodes; and deploying, by the at least one in-chain node in the plurality of in-chain nodes, a second BID document according to the second BID, and recording the public key of the new holder carried by the cross-chain transaction into the second BID document.

4. The method of claim 1, wherein the verifying, by the source chain, the signature with the read public key of the original holder and initiating the cross-chain transaction in a case where the signature passes verification comprises:

verifying, by the source chain, the signature with the read public key of the original holder, and determining whether the new holder is an account registered in the source chain according to the BID of the new holder, in a case where the signature passes verification; and if the new holder is not an account registered in the source chain, initiating the cross-chain transaction.

5. The method of claim 4, further comprising:

if the new holder is an account registered in the source chain, replacing the public key of the original holder in the first BID document with the public key of the new holder.

6. The method of claim 1, wherein the querying, by the source chain, the corresponding first BID document according to the first BID and reading the public key of the original holder from the first BID document comprises:

querying, by the source chain, the corresponding first BID document according to the first BID, and reading the status identifier in the first BID document;

if the read status identifier in the first BID document is the first identifier, reading the public key of the original holder from the first BID document; and if the read status identifier in the first BID document is the second identifier, terminating the data transfer transaction instead of reading the public key of the original holder from the first BID document.

7. The method of claim 1, wherein after replacing, by the source chain in response to the prompt information, the public key of the original holder in the first BID document with the public key of the new holder, the method further comprises:

generating, by the source chain, a verifiable statement indicating that the source chain has replaced the public key of the original holder in the first BID document with the public key of the new holder;

sending, by the source chain, the verifiable statement to the terminal of the original holder; and forwarding, by the terminal of the original holder, the verifiable statement to a terminal of the new holder.

8. A system for cross-chain transfer of data based on decentralized identifiers, wherein the system comprises a source chain and a target chain, the source chain is configured to receive a data transfer transaction sent by a terminal of an original holder, the data transfer transaction carrying at least a first blockchain-based identifier (BID) of data to be transferred, a public key of a new holder, a BID of the new holder, and a signature of the data transfer transaction;

the source chain is further configured to query a corresponding first BID document according to the first BID, and to read a public key of the original holder from the first BID document;

the source chain is further configured to verify the signature with the read public key of the original holder, and to initiate a cross-chain transaction in a case where the signature passes verification, the cross-chain transaction carrying at least the first BID, the public key of the new holder, and the data to be transferred;

the target chain is configured to receive the cross-chain transaction, and to deploy a second BID document according to the first BID, the second BID document corresponding to a second BID, and the second BID document recording the public key of the new holder and the data to be transferred;

the target chain is further configured to return to the source chain prompt indicating that the target chain has successfully built the second BID document; and the source chain is further configured to replace the public key of the original holder in the first BID document with the public key of the new holder in response to the prompt information;

wherein a status identifier is recorded in the first BID document; if the status identifier is a first identifier, it means that the first BID document is accessible, and if the status identifier is a second identifier, it means that the first BID document is inaccessible; and after the source chain replaces the public key of the original holder in the first BID document with the public key of the new holder in response to the prompt information, the source chain is further configured to update the status identifier of the first BID document to the second identifier.

9. The system of claim 8, wherein at least one BID comprises a blockchain identifier and a suffix string, at least one blockchain identifier is used to route to a corresponding blockchain according to the blockchain identifier during a resolution of the BID comprising the blockchain identifier, and the suffix string corresponding to the same piece of data is unique in the BID of at least one blockchain; and wherein the blockchain identifier comprised in the first BID is a blockchain identifier of the source chain, the blockchain identifier comprised in the second BID is a blockchain identifier of the target chain, and the suffix string comprised in the first BID is the same as the suffix string comprised in the second BID.

10. The system of claim 9, wherein the target chain comprises:

a backbone node configured to receive the cross-chain transaction, to read the first BID from the cross-chain transaction, to replace the blockchain identifier in the first BID with the blockchain identifier of the target chain to generate the second BID, and to send the second BID and the cross-chain transaction to at least one in-chain node in the plurality of in-chain nodes; and a plurality of in-chain nodes, at least one in-chain node in the plurality of in-chain nodes being configured to deploy a second BID document according to the second BID, and to record the public key of the new holder carried by the cross-chain transaction into the second BID document.

11. The system of claim 8, wherein the source chain is further configured to verify the signature with the read public key of the original holder, to determine whether the new holder is an account registered in the source chain according to the BID of the new holder in a case where the signature passes verification, and to initiate the cross-chain transaction if the new holder is not an account registered in the source chain.

12. The system of claim 11, wherein the public key of the original holder in the first BID document is replaced with the public key of the new holder if the new holder is an account registered in the source chain.

13. The system of claim 8, wherein the source chain is further configured to query the corresponding first BID document according to the first BID, to read the status identifier in the first BID document, to read the public key of the original holder from the first BID document if the read status identifier in the first BID document is the first identifier, and to terminate the data transfer transaction instead of reading the public key of the original holder from the first BID document if the read status identifier in the first BID document is the second identifier.

14. The system of claim 8, wherein after replacing the public key of the original holder in the first BID document with the public key of the new holder in response to the prompt information, the source chain is further configured to generate a verifiable statement indicating that the source chain has replaced the public key of the original holder in the first BID document with the public key of the new holder, and to send the verifiable statement to the terminal of the original holder.

15. The system of claim 14, wherein the terminal of the original holder is configured to forward the verifiable statement to a terminal of the new holder.

* * * * *